United States Patent [19]

Ambrose et al.

[11] Patent Number: 4,605,724

[45] Date of Patent: Aug. 12, 1986

[54] HIGH SOLIDS LACTONE-POLYESTER POLYOLS AND COATING COMPOSITIONS THEREOF

[75] Inventors: Ronald R. Ambrose, Allison Park; Wen-Hsuan Chang; David T. McKeough, both of Gibsonia; John R. Peffer, Pittsburgh, all of Pa.

[73] Assignee: PPG Industries, Inc., Pittsburgh, Pa.

[21] Appl. No.: 656,555

[22] Filed: Oct. 1, 1984

[51] Int. Cl.$^4$ .................. C08G 18/32; C08G 18/42
[52] U.S. Cl. ........................... 528/73; 528/80; 528/44; 528/272; 528/354
[58] Field of Search ............ 528/80, 354, 272; 521/172

[56] References Cited

U.S. PATENT DOCUMENTS

| | | | |
|---|---|---|---|
| 2,914,556 | 11/1959 | Hostettler et al. | 528/80 |
| 2,977,385 | 3/1961 | Fowler et al. | 528/80 |
| 2,990,379 | 6/1961 | Young et al. | 528/80 |
| 3,007,899 | 11/1961 | Urs | 260/75 |
| 3,049,515 | 8/1962 | Damusis | 260/77.5 |
| 3,658,761 | 4/1972 | Hostettler et al. | 528/80 |
| 3,726,887 | 4/1973 | Pohl et al. | 521/172 |
| 3,746,665 | 7/1973 | Koleske et al. | 528/80 |
| 3,761,439 | 9/1973 | Ward et al. | 528/80 |
| 4,010,311 | 3/1977 | Lewis et al. | 428/424 |
| 4,098,743 | 7/1978 | Scriven et al. | 528/354 |
| 4,284,750 | 8/1981 | Amirsakis | 528/79 |
| 4,379,915 | 4/1983 | Watanabe et al. | 528/354 |
| 4,447,591 | 5/1984 | Watanabe et al. | 528/80 |
| 4,451,622 | 5/1984 | DiDomenico | 525/456 |
| 4,469,616 | 9/1984 | Hostettler | 252/182 |

FOREIGN PATENT DOCUMENTS 56066 11/1974 Australia .

Primary Examiner—Herbert S. Cockeram
Attorney, Agent, or Firm—Godfried R. Akorli

[57] ABSTRACT

There are disclosed herein lactone-polyester polyols which are derived from lactones, resinous polyols thereof, and coating compositions formulated therewith. The polyester polyols are typically prepared by reacting a large excess of low molecular weight polyols with lactones or functional equivalents thereof. The polyols are employed in amounts sufficient to produce reaction products containing a significant amount of unreacted polyols which can be subsequently removed by means such as vacuum distillation.

9 Claims, No Drawings

HIGH SOLIDS LACTONE-POLYESTER POLYOLS AND COATING COMPOSITIONS THEREOF

BACKGROUND OF THE INVENTION

1. Field of the Invention

The present invention relates to resinous polyols which are particularly useful in high solids coating compositions. More specifically, the present invention relates to high solids polyester polyols which are prepared by reacting low molecular weight polyols with a lactone or functional equivalents thereof, wherein the reaction product is characterized by the presence of a significant amount of unreacted starting polyols.

2. Brief Description of the Prior Art

In preparing resinous polyols, particularly low molecular weight ones, the full implications of employing starting polyols in amounts that would produce reaction products with significant amounts of unreacted starting polyols had not been appreciated. Certainly, the significance of removing the attendant unreacted starting polyols from reaction products had not been appreciated in the art. Specifically, it had not been appreciated that by removing unreacted starting polyols, performance properties of coating compositions comprising the resultant resinous polyol could be affected significantly.

In the prior art preparation of low molecular weight resinous polyols, there are employed controlled amounts of starting polyols. The amounts of starting polyols are controlled in such a manner as would produce resinous polyols containing tolerable amounts of unreacted starting polyols. Usually, unreacted starting polyols in these amounts, i.e., up to about 5 percent, are not intentionally removed from the reaction product.

In the somewhat related areas of preparing high molecular weight resins, low molecular weight polyols are sometimes removed as by-products of the polymerization process. The intent or effect of removing the polyols is quite different from that of the present invention. In these areas, removal of polyols is necessary to obtain the desired high molecular weight products. For example, in preparing high molecular weight polyester polyols for fiber manufacture, low molecular weight polyester polyols are made to undergo transesterification reaction. This results in an increase in molecular weight and is accompanied by formation of low molecular weight polyols as by-products. Removal of the low molecular weight polyol by-products from the reaction mixture is critical to the formation of the high molecular weight polyesters. In another example of preparing high molecular weight polyester polyols, polyols can be removed as a corrective measure, with a consequential molecular weight increase in the resultant polyester polyols.

In the present invention, starting polyols can be employed in relatively large excess with the intent of substantially increasing the low molecular weight and narrow molecular weight distribution of the resultant resinous polyols. The reaction product is attended by a significant amount of unreacted starting polyol; a portion or all of the unreacted starting polyol can be subsequently removed from the reaction product. Thus, the low molecular weight and the narrow molecular weight distribution of the resinous polyol is optimized.

SUMMARY OF THE INVENTION

In accordance with the foregoing, the present invention encompasses a polyester polyol having a number average molecular weight of up to about 1000 which is prepared by reacting a diol with a lactone or a functional equivalent thereof, wherein the starting diol is in an amount sufficient to produce a reaction product containing a "significantly high amount", i.e., about 10 percent or higher and preferably about 21 percent or higher of unreacted starting diol. The percent is by weight and is based on the weight of the reaction product.

The invention further encompasses a polyester polyol having a low number average molecular weight of up to about 1000 which is prepared by reacting a polyol with a lactone or a functional equivalent thereof, wherein the starting polyol is in an amount sufficient to produce a reaction product containing a "significant amount", i.e., about 5 percent by weight or higher of unreacted starting polyol. The percent by weight is based on the weight of the reaction product. Integrally, this is followed by removing about 30 percent by weight or higher of the unreacted starting polyol from the reaction product under essentially non-reacting conditions. Removal of the unreacted starting polyol can be effected by physical means such as distillation which is preferred herein, or by alternate means such as crystallization or extraction.

In specific embodiments, the present invention encompasses a polyester polyol having a number average molecular weight of up to about 1000 which is prepared by reacting a diol such as neopentyl glycol with a lactone, such as epsilon-caprolactone, or a functional equivalent thereof such as a hydroxy acid. The starting polyol is employed in an amount sufficient to produce a reaction product containing about 5 percent or higher and preferably about 21 percent or higher unreacted starting polyol. This can be followed by removing about 30 percent by weight or higher of the unreacted starting polyol, under essentially non-reacting conditions.

The polyester polyol of this invention can be further reacted with an acid, an anhydride, a lactone, an isocyanate or the like to form resinous polyols of varying molecular weight. The further reaction can be conducted before or after the removal of the unreacted starting diol. The resultant product will be different depending on whether the further reaction is before or after the removal of the unreacted starting polyol.

In the practice of this invention, coating compositions can be formulated with the above polyester polyol or resinous polyol thereof, in combination with curing agents such as aminoplasts, phenoplasts and polyisocyanates. The coating compositions can be of a high solids type. They can have sprayability at a solids content of at least 40 percent or higher. As such, the coating compositions of this invention can be of relatively low volatile organic content (VOC). In this context, the terms molecular weight, solids content, sprayability and volatile organic content (VOC) are defined as follows.

The molecular weight refers to a number average molecular weight as determined by gel permeation chromatography using a glycol standard. Therefore, it is not the actual number average molecular weight which is measured but a number average molecular weight which is relative to the glycol standard. The number average molecular weight herein excludes contributions by unreacted starting polyols.

The solids (i.e., the non-volatile) content of the resinous polyol is determined by ASTM D-2369 testing modified as follows: 0.5 grams of the resinous polyol (i.e., the reaction mixture which may comprise unreacted polyol) is mixed with 5 milliliters of 1:1 mixture of acetone and tetrahydrofuran and heated at 105° C. for 2 hours in a forced draft oven. The resinous polyol is then cooled in a desiccator, reweighed and the non-volatile content calculated. The percentage by weight of the resinous polyol remaining is reckoned as the solids content. By this method, unreacted starting polyol which is usually volatile would not be included in the determined solids.

The term "sprayability" means the maximum concentration of solids at which the coating composition can be atomized sufficiently to form a uniformly deposited coating, under normal spraying conditions of, say, temperature, pressure, and spray equipment design such as entails the use of an air suction gun operating at 60 psi with a No. 30 air cap. This maximum concentration is solvent dependent and usually occurs in a viscosity range of 20 to 24 and preferably at about 22 seconds with a No. 4 Ford cup at room temperature after thinning with a solvent such as a mixture of methyl amyl ketone and ethoxyethyl acetate. Above this maximum concentration, appearance as manifested by leveling and solvent popping typically becomes unacceptable.

The VOC is defined as weight per volume of any compound of carbon which evaporates from a paint or related coating material under the specific conditions for the determination of the non-volatile content of that material. This does not include water which is volatile under the test conditions. Thus, the water content of the material undergoing analysis must be determined. To obtain the VOC of a sample, the non-volatile content, water content and the density of the material are determined. The VOC number is calculated by correcting the total organic volatile content for the water content and dividing by the volume of the paint corrected for the water content. The determination of the VOC is by ASTM D-3960 testing which entails heating the paint or related coating material at 110° C. for 1 hour.

In this text, the term "significant amount" of unreacted starting polyol denotes an amount that is equal to or more than that which would have been presumed to be tolerable in high solids resinous polyols known in the art. Heretofore, amounts in excess of the tolerable amounts would have been considered detrimental because of associate negatives which are discussed hereinafter. The term "significantly high amount" is used in distinction to denote an amount that is substantially more than the presumed tolerable amount. An estimate of the unreacted starting polyol can be obtained from the resin solids content of the polyester polyol. Alternately, an estimate of the unreacted starting polyol can be obtained by GPC.

The GPC estimate of the glycol content may be obtained using the area of the glycol peak in relation to the total area under all components of the chromatogram.

$$\text{Percent glycol} = \left( \frac{\text{Area of glycol peak}}{\text{Sum of the areas of all the peaks}} \right) \times 100$$

The percent glycol calculated is based on the assumption that the detector gives the same weight to area response for all components.

DETAILED DESCRIPTION OF THE INVENTION

The claimed invention encompasses in one aspect, polyester polyols containing significantly high amounts, i.e., at least 10 percent or higher of unreacted starting diols wherein the unreacted starting polyol is not removed. As fully explained hereinafter, these polyester polyols are advantaged by the preponderance of low molecular weight species and narrow molecular weight distribution. They have utility as intermediates for the preparation of other resinous materials, and can have utility in their own right as film-formers, particularly as low temperature-curable film-formers, or as reactive diluents that allow application of coating compositions thereof, at high solids content.

To be sure, there are known in the art polyester polyols containing tolerable amounts of unreacted starting polyols which are not removed. However, the unreacted starting diols are present in substantially lower amounts. Hence, the lactone-polyester polyols containing significantly high amounts of unreacted starting diol are believed to be novel.

In the other aspect, the present invention encompasses polyester polyols containing a "significant amount", i.e., about 5 percent or higher, typically about 10 percent or higher, and preferably about 21 percent or higher of starting polyol which is removed in part or in all. These polyester polyols are of optimized low molecular weight and narrow molecular weight distribution. They can be formulated into high solids coating compositions of high sprayability and low VOC. Surprisingly, it has been found that performance properties such as flexibility and overbake tolerance of coating compositions of the polyester polyol can improve, when the unreacted starting polyols are removed.

The preparation of the polyester polyols of this invention involve a ring opening reaction of a lactone which is initiated by a polyol. The distribution of species in the resultant product is believed to follow the Poisson distribution which is:

$$P(x) = \frac{(n\theta)^x}{x!} e^{-n\theta}$$

where $P(x)$ = the probability of forming a species (polyol.lactone)$_x$, i.e., lactone-polyol reaction products having repeating units of x, wherein x = 0, 1, 2, 3, . . . ; n = the number of possibilities of a lactone reacting with another molecule; $\theta$ = the probability that a given lactone can react with a polyol or (polyol.lactone)$_x$; and e is the base for the natural logarithm.

In accordance with the Poisson distribution, when a diol A is reacted with a lactone B to form a polyester, there is obtained a distribution of species which may be described as follows:

$$A + B \rightleftharpoons A_1 + A_1B_1 + A_1B_2 + A_1B_3 + \ldots$$

As would be realized, the species $A_1B_1$ and to some extent $A_1B_2$ which are low molecular weight species are more desirable for high solids compositions. To obtain these polyester polyols, it would have been theorized that one would have to employ relatively higher quantities of starting polyols. This would have had a limited practical use because the high quantities of starting polyols would result in correspondingly high quantities of unreacted starting polyols which are believed to have the following negatives. The unreacted starting polyols which are in the nature $A_1$ are of relatively lower molecular weight. Hence, they may volatilize during heat curing of coatings containing same. When cured into coatings with curing agents such as melamines, they may impart brittleness to the coating.

In view of the above negatives, it would seem that in preparing low molecular weight resinous polyols for coatings with low VOC, there is a point of diminishing returns beyond which the use of still higher quantities of starting polyols either produces no change in VOC or causes an increase in VOC. Apparently, at this point, there are present intolerable amounts of unreacted starting polyols.

The present invention exceeds the prohibitive point of diminishing returns. In accordance with this invention, the polyester polyols contain a "significant" or "significantly high" amount of unreacted starting polyol. The polyester polyols are characterized by a preponderance of low molecular weight species. When the unreacted starting polyol is removed, the polyester polyols are further characterized by optimized narrow molecular weight distribution.

This aspect of the invention is demonstrated below by the preparation of high solids polyester polyols. The preparations entail the reactions of a diol of molecular weight of 146 with a lactone of molecular weight of 114, in different mole ratios to 100 percent extent of reaction. The weight percent of species can be calculated from the Poisson distribution. The calculated results are shown below.

TABLE I

| Mole Ratio Diol/Lactone | Weight Percent of Unreacted Diol $A_1$ | Weight percent of Desired Low Molecular Weight Species $A_1B_1$ | Weight Percent of Higher Molecular Weight Species $A_1B_2 + \ldots$ |
|---|---|---|---|
| (i) 0.62:1 | 9.0 | 25.8 | 65.2 |
| (ii) 1:1 | 20.9 | 37.2 | 41.9 |
| (iii) 2.3:1 | 50.1 | 38.2 | 11.7 |

As can be seen from the above Table, more of the $A_1B_1$ species and less of $A_1B_2$ and higher species are obtained with increasing diol/lactone ratios. Associated with the increasing ratios, however, are increasing amounts of unreacted diol. In accordance with this invention, all or part of the unreacted diol can be removed. With the unreacted diol removed, the polyester polyol contains high proportions of the desired low molecular weight $A_1B_1$ species as shown by the above table. The resultant polyester polyol is of low molecular weight and narrow molecular weight distribution.

In accordance with this invention, the unreacted starting polyols are removed in amounts sufficient to give the desired solids content and performance properties in cured films. Typically, at least 30 percent and preferably from about 60 percent or higher of the unreacted starting polyol can be removed from the reaction product under essentially non-reacting conditions. The percent is by weight and is based on the weight of the unreacted starting polyol. By non-reacting conditions herein is meant the conditions under which the unreacted polyol is removed by, say, distillation wherein further reactions of the polyester polyol are minimized. In most instances, the non-reacting conditions would be a function of temperature, pressure, catalyst level, natures of the polyester polyol and the unreacted polyol in question and the like.

Illustratively, it is preferred that the temperature at which the unreacted starting polyol is removed be lower than the temperature at which the polyester polyol is prepared. It is also preferred that catalysts for the preparation of the polyester polyol be employed at low levels. Alternately, if the catalyst is present at high levels, it should be removed or neutralized before the removal of the unreacted starting polyol. As would be realized, relatively higher temperatures or levels of catalyst would render the polyester polyol more susceptible to further reaction.

The following is a description of the useful reactants of the invention and the processing thereof to produce the instant polyester polyols. As the starting polyol, one or more polyols can be employed in the preparation of the polyester polyols. The starting polyols are low molecular weight simple polyols which are distinguishable from polymeric polyols. One or more polyols can be employed; they can be cyclic or acyclic, or a mixture thereof. Examples of the cyclic polyols are 1,4-cyclohexanediol and 1,4-cyclohexanedimethanol. Examples of the acyclic polyols are those containing, preferably, from about 2 to 14, more preferably 3 to 10, and most preferably 3 to 6 carbon atoms. Non-limiting examples of the acyclic polyols are ethylene glycol, propylene glycol, diethylene glycol, 1,4-butanediol, neopentyl glycol, 1,6-hexanediol, trimethylpentanediol and dipropylene glycol. The use of low molecular weight diols or glycols is preferred herein. Higher functionality polyols such as triols, while not preferred, can be used, preferably in admixture with the diols. An example of the higher functional polyol is trimethylolpropane.

Examples of the lactones useful herein can be caprolactones such as epsilon-caprolactone, valerolactones such as delta valerolactone, butyrolactones and substituted lactones. Precursors or equivalents of the lactones, e.g., hydroxy acids such as glycolic acid in accordance with this invention are also encompassed hereby.

Typically, the esterification reaction is conducted over a temperature range of 50° to 300° C., preferably in the presence of a catalyst, and is usually carried to completion. The esterification reaction can be terminated before completion, if necessary. The unreacted lactone groups or functional equivalents thereof may be removed from the reaction product, preferably by chemical means.

The resultant polyester polyol can be reacted further with, say, acids, isocyanates, lactones and the like either before or after the unreacted starting polyol has been removed.

The ratios of reactants in accordance with this invention are such as would yield a reaction product containing a significant amount, i.e., about 5 percent, typically about 10 percent, and preferably about 21 percent or higher of unreacted starting polyol. The particular ratios of reactants depend on the nature of the reactants, the desired molecular weight and/or molecular weight distribution and the extent of reaction.

Illustratively, to obtain polyester polyols containing a "significant amount" of unreacted starting polyol, i.e., about 5 percent, typically 10 percent, and preferably 21 percent or higher, a diol and the lactone can be reacted typically in a mole ratio of about 0.5 to 15:1 and preferably from 0.7 to 4:1, with the reaction being carried essentially to completion. To obtain polyester polyols containing a "significantly high" amount of unreacted starting diol, i.e., about 10 percent and preferably 21 percent or higher unreacted starting polyol, a starting diol can be reacted with the lactone typically in a mole ratio of 1 to 4:1 and preferably from about 2.3 to 4:1, with the reaction being carried essentially to completion.

As would be realized, for the same extent of reaction, the higher the ratios of starting polyols and for that matter the higher the amount of unreacted starting polyol, the lower is the kettle yield of the polyester polyol.

The following is a description of a process of removing the unreacted starting polyols. Removal of the unreacted starting polyol is typically effected by means such as a distillation process. This process is generally known in the art. It entails removing the unreacted starting polyol from the reaction product by vaporization and condensation. Typically, the distillation is conducted at reduced pressure and at temperatures below the atmospheric boiling point of the reaction mixture.

Illustratively, an unreacted diol which has a low boiling point and which does not crystallize at room temperature can be removed as follows. A reaction product comprising same is heated to a pot temperature of about 100° C. and the distillation apparatus is depressurized below atmospheric pressure to about 300 to 0.01 torr. After the depressurization, heating of the reaction product is continued typically over the range of 100° to 150° C. pot temperature until the required amount of diol is removed. Higher temperature ranges can be employed if there is no further reaction of the resinous polyol. To facilitate the removal of the diol, there may be introduced in the heating vessel a carrying means for the unreacted diol.

An unreacted diol which crystallizes at room temperature can be removed by employing a relatively high absolute reduced pressure of about 100 torr, a pot temperature of about 150° C., using a condenser coolant at a temperature which will effect condensation of the glycol. Said temperature typically is above the melting point of the diol in the distillation apparatus.

It is of interest that the GPC of the resultant product, after unreacted polyol is removed, does not show the expected statistical distribution. In effect, the aspect of the distribution that would otherwise be ascribed to the removed unreacted polyol is absent from the GPC. The number average molecular weight of the resultant polyester polyol with the unreacted starting polyols removed is up to 1000 and preferably in the range of 200 to 700. The hydroxy value thereof is from about 150 to 560. The solids content of the resultant polyester polyol can be from 85 to 100 percent and preferably from 95 to 100 percent.

The polyester polyol can be reacted further preferably with polyisocyanates so as to form polyester-urethane polyols. The polyester polyols can be reacted with polyisocyanates in an equivalent ratio of 0.02 to 0.8:1. For high solids applications, it is preferred that the number average molecular weight of the polyester-urethane polyol be up to about 2000 and preferably from about 500 to 900. The hydroxyl value is at least 50 and preferably from about 125 to 225.

In measuring the molecular weight using glycols as the standard, a Waters Associate gel permeation chromatograph was used. One Varian Micro Pak TSK 1000H exclusion column available from Varian Instrument Group, Walnut Creek, Calif., U.S.A., was used. This column has the dimensions of 50 centimeters long and 7.5 millimeters inside diameter. A differential refractometer was used as detector. Tetrahydrofuran was used as a solvent with a flow rate of 1.0 milliliters/minute. The quality of the column is checked by its "theoretical plate number" determined from ortho-dichlorobenzene and the column with theoretical plate number greater than 8000/50 cm was used.

To determine molecular weight by gel permeation chromatography (GPC), the instrument is first calibrated using glycol standards. Glycol standards were purchased from Polymer Laboratories Ltd., Church Stretton, U.K. The weight average molecular weights of the glycol standards used were 998, 425 and 76 for polyethylene glycol, polyethylene glycol and propylene glycol, respectively. To obtain a calibration curve, a set of 2 percent by volume glycol solutions in tetrahydrofuran were prepared and a 75 microliters sample size was injected into the column and a GPC chromatogram was obtained. A linear least square fit of $\log_{10}$ (molecular weight) versus elution time of each standard is used as a calibration curve. The sample whose molecular weights are to be determined was prepared as a 1.0 percent per volume tetrahydrofuran solution. After filtration through a 0.5 micron filter, available from Gelman Corporation, Catalog No. 4219, a 75 microliters sample size was injected into the columns and a GPC chromatogram obtained under the same experimental conditions as the calibration. The chromatogram is divided into vertical segments of equal elution volume of approximately one milliliter and the height of each segment (Hi) and the corresponding molecular weight (Mi) obtained from the calibration curve are used to calculate the number average molecular weight (Mn) according to the equation:

$$Mn = \Sigma_{i=1}^{i} Hi / \Sigma_{i=1}^{i} (Hi/Mi)$$

The weight average molecular weight (Mw) is calculated according to the equation:

$$Mw = \Sigma HiMi / \Sigma Hi$$

The molecular weight distribution or polydispersity (Pd) is calculated according to the equation:

$$Pd = \overline{Mw}/\overline{Mn}$$

In the practice of the invention, the polyester polyols, or the modified forms thereof, can be employed in combination with a curing agent which is capable of reacting with the active hydrogens in the former so as to give thermosetting compositions. Examples of the curing agent are aminoplasts and blocked or unblocked isocyanates. Usually, a cure catalyst is employed therewith.

Aminoplast condensates are obtained from the reaction of formaldehyde with an amine or an amide. The most common and preferred amines or amides are melamine, urea or benzoguanamine. However, condensates with other amines and amides can be employed, for example, aldehyde condensates of diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuraldehyde may be used.

The aminoplast contains methylol or similar alkylol groups and preferably at least a portion, and more preferably all, of these alkylol groups are etherified by reaction with an alcohol to provide organic solvent-soluble resins. Any monohydric alcohol can be employed for this purpose including such alcohols as methanol, ethanol, butanol and hexanol. The cure catalysts usually employed are dodecylbenzene sulfonic acid, para-toluene sulfonic acid and butylstannoic acid.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof.

Examples of suitable polyisocyanates that can be blocked or unblocked include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commercially available from Mobay Chemical Company as DESMODUR N. The polyisocyanate can be blocked with suitable blocking agents which would unblock at elevated temperatures such as low aliphatic alcohols such as methanol, oximes such as methyl ethyl ketone oxime, and lactams such as caprolactam.

The amounts of resinous polyol or the modified form thereof and curing agent which are used in the practice of the invention are preferably adjusted so that the weight ratio of the resinous polyol:curing agent is within the range of 6 to 0.5:1, preferably 3 to 1:1.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention can be of the high solids type, a liquid diluent is usually present in the composition. By liquid diluent is meant a solvent or non-solvent which is volatile and is removed after the coating is applied and is needed to reduce viscosity sufficiently to enable one, by simple coating techniques, namely, spraying, to spread the coating to controllable, desired and uniform thicknesses. Also, diluents assist in substrate wetting, resinous component compatibility, package stability and film formation. Examples of suitable diluents include aromatic hydrocarbons such as toluene and xylene, ketones such as methyl ethyl ketone and methyl isobutyl ketone, alcohols such as isopropyl alcohol, normal-butyl alcohol, monoethers of glycols such as the monoethers of ethylene glycol and diethylene glycol, monoether glycol acetates such as 2-ethoxyethyl acetate, as well as compatible mixtures thereof. The diluent is present in amounts of up to 60 percent by weight, usually 35 to 55 percent by weight, based on total weight of diluent and resin solids.

It is of note that the lactone-polyesters of this invention can be used as reactive diluents. As reactive diluents, they are capable of thinning coating compositions and yet are reactive with the film-forming material of the coating compositions, upon cure. The forming material can be an active hydrogen-containing resin such as a resinous polyol. The reactive diluent can be used in an amount sufficient to give the desired viscosity, VOC and sprayability. Typically, the reactive diluent is used in amounts of about 3 to 40 percent, and preferably about 15 to 30 percent by weight based on the total weight of the composition.

In addition to the above ingredients, various fillers, plasticizers, anti-oxidants, U.V. light absorbers, flow control agents, surfactants, and other formulating additives can be employed if desired. These materials are optional and generally constitute up to about 20 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating including brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings can be useful on resilient and rubbery substrates, elastomeric parts, plastics, or on metal surfaces such as steel and aluminum.

The following examples further illustrate the invention.

EXAMPLE 1

Part 1

A polyester polyol was prepared, as follows:

| Ingredients | Parts by Weight (kilograms) | Kilograms-Moles |
| --- | --- | --- |
| Trimethylpentanediol | 503.0 | 3.44 |
| Epsilon-Caprolactone | 631.3 | 5.54 |
| Stannous octoate | 0.070 | |

To a 300-gallon stainless steel reactor equipped with stirrer, reflux condenser, heating means, and means for measuring and controlling temperature were charged the diol and lactone and heated to 49° C. The reaction vessel and the rest of the reaction equipment were degassed 3 times by alternately applying reduced pressure of 15 to 20 torr, followed by sweeping the vessel and the rest of the equipment with nitrogen gas. With the vacuum off and under a nitrogen atmosphere, heating was continued. At 159° C., the 0.070 kilograms of stannous octoate were added to the reaction mixture which was then held for about 3½ hours at about 160° C. At this time, it was determined by infrared spectroscopy that all the epsilon-caprolactone had reacted. The reaction vessel was then cooled and its contents discharged and analyzed. Analysis: Determined solids content was 83.9 percent, acid value was 0.8, viscosity was 3.09 stokes, hydroxyl value was 311.5; estimated unreacted starting polyol based on solids content was 16.1; $M_n$ was 507, $M_w$ was 600 and $M_w/M_n$ was 1.18.

Part 2

Unreacted diol can be removed from the above reaction product comprising a polyester polyol by vacuum distillation.

The distillation apparatus used herein comprised of a vessel (or pot), a condenser(s), a receiver(s) and vacuum source as described more fully below.

Description of the Apparatus

The vessel comprised of a 4-neck flask equipped with a stirrer, addition funnel, a thermometer for measuring pot temperatures and a (CLAISEN type) adaptor. The adaptor was connected to a condenser (FRIEDRICH type, herein referred to as Condenser 1). The adaptor was equipped with two thermometers for measuring head temperatures at point (A) closer to the pot and point (B) closer to Condenser 1.

As a condensing means for glycol-rich vapors, water at room temperature or higher temperatures or steam was used in Condenser 1. A receiver which was a 3-neck flask (herein referred to as Receiver 1) was attached to the Condenser 1. By means of a U-shaped connecting adaptor, Receiver 1 was connected in series to another receiver which was also a 3-neck flask (herein referred to as Receiver 2). Receiver 2 was connected to another condenser (ALLIHN type, herein referred to as Condenser 2). As a condensing means for water-rich vapors, water at ambient temperature was used in Condenser 2. To this condenser was attached yet another condenser (DEAN type) which functioned as a trap for materials that might lead into a vacuum source attached thereto.

The Distillation Process 2000 grams of the reaction product of Part 1 were charged to the flask of the apparatus described hereinabove. Heating was commenced, and the system was placed under vacuum at a pressure of 40 torr. Steam was passed through Condenser 1 and water at 10° C. was passed through Condenser 2. At a pot temperature of 170° C., the head temperatures measured at points (A) and (B) were 132° C. and 32° C., respectively.

Water was then added through the dropping funnel at 30 drops per minute into the vessel and distillation began immediately. The pot temperature was 170° C. and the head temperatures at points (A) and (B) were 132° C. and 110° C., respectively. In 20 minutes the pot temperature was 167° C. At this point, distillate was being condensed and collected in Receiver 1 at a rate of 122 drops per minute. The temperatures at Condensers 1 and 2 were 100° C. and 10° C., respectively. The head temperatures at (A) and (B) were 144° C. and 125° C., respectively. Heating was continued during the next 1¼ hours with the pot temperature increasing to 180° C. At this stage water was being added to the pot at a rate of 118 drops per minute. Distillate was being condensed and collected into Receiver 1 at a rate of 27 drops per minute, and into Receiver 2 at a rate of 130 drops per minute. The head temperatures at (A) and (B) were 152° C. and 94° C., respectively. At this point, the distillation process was interrupted so as to determine the solids content. The determined solids content was 95.5 percent.

The distillation was continued for 30 minutes at 40 torr and another 20 minutes at 35 torr. During the final stages of the distillation, water was being introduced into the flask at a rate of 88 drops per minute, the distillate was being condensed into Receiver 1 and Receiver 2 at a rate of 26 and 111 drops per minute, respectively. The head temperatures at (A) and (B) were 157° C. and 100° C., respectively, and the pot temperature was 186° C. The distillation was stopped by terminating water addition, releasing the vacuum and cooling the contents of the flask.

A total of 490 grams of water was added to the vessel during the distillation process. 389.8 grams of distillate were collected in Receiver 1; 496.7 grams of distillate were collected into Receiver 2; 1540 grams of product remained in the flask. Analysis: Determined solids content was 99.1 percent, viscosity was 4.1 stokes, acid value was 0.6, hydroxyl value was 260.7; $M_n$ was 509, $M_w$ was 602 and $M_w/M_n$ was 1.182. Estimated unreacted starting diol based on solids content was 0.9 percent.

EXAMPLE 2

Part 1

A polyester polyol was prepared, as follows:

| Ingredients | Parts by Weight (grams) | Moles |
| --- | --- | --- |
| 2,2,4-trimethyl-1,3-pentanediol | 3006 | 20.59 |
| Epsilon-caprolactone | 1002 | 8.79 |
| Stannous octoate | 1.8 | |
| Triphenyl phosphite | 0.4 | |

To a properly equipped reaction vessel were charged the diol and lactone and maintained at 47° C. The reaction vessel and the rest of the reaction equipment were degassed 3 times by alternately applying reduced pressure in the range of about 15 torr, followed by sweeping the vessel and the rest of the equipment with nitrogen gas. With the vacuum off and under a nitrogen atmosphere, stannous octoate was added to the reaction mixture and heating was commenced. About 20 minutes thereafter and at 90° C., the triphenyl phosphite was added to the reaction mixture. The reaction mixture was heated up to 160° C. and held at that temperature for 2 hours.

A sample testing of the reaction mixture by infrared analysis showed no presence of caprolactone, thus indicating the completion of the reaction. The reaction product had a determined solids content of 27.3 percent, a viscosity of 2.2 stokes and hydroxyl value of 552.5. The number average molecular weight was 350 and the weight average molecular weight was 380. The molecular weight distribution was 1.083.

Part 2

Unreacted glycol was removed from the above reaction product by vacuum distillation, as follows.

Four thousand grams of the reaction product of Part 1 were charged to the vessel of the apparatus described hereinabove. Heating was commenced and the apparatus was placed under vacuum at a pressure of 40–48 torr. Steam was passed through Condenser 1 and water at ambient temperature was passed through Condenser 2. At a pot temperature of 150° C., head temperatures at (A) and (B) were 50° C. and 25° C., respectively. Water was then added through the dropping funnel at 12 drops per minute, and distillation began immediately. At a pot temperature of 163° C., the head temperatures at (A) and (B) were 155° C. and 145° C., respectively. Heating was continued during the next hour with the temperature of the pot reaching 176° C. The head temperatures at (A) and (B) were 149° C. and 141° C., respectively. At this stage, water was being added to the pot at a rate of 30 drops per minute. The distillate was being condensed and collected into Receiver 1. The distillation was continued for five additional hours. At this time, the pot temperature was 185° C. The head temperatures at (A) and (B) were 80° C. and 60° C., respectively. The distillation process was interrupted so as to determine the solids content. The solids content was 91.0 percent.

To remove more glycol, the vacuum distillation with water addition was continued for about 2½ more hours at a pot temperature of 185° C. and pressures of 40 torr for the first 1½ hours and 35 torr for the final hour. Water was added at an initial rate of 1.7 cc/minute (34 drops/minute) and was increased gradually to 3.8 cc/minute (76 drops/minute). During this final stage of the distillation, the head temperatures at (A) and (B) were 84° C. and 60° C. The distillation process was stopped by terminating water addition, turning off the pot heater and releasing the vacuum.

A total of 1455 grams of water were added to the vessel during the distillation process. 3220 grams of distillate were collected in Receiver 1; 580 grams of distillate were collected into Receiver 2; about 1500 grams of product remained in the flask.

The reaction product had a solids content of 93.7 percent, viscosity of 48 stokes, hydroxyl value of 361.7; estimated unreacted starting diol based on solids content was 6.3 percent, Mn was 365, Mw was 402 and Mw/Mn was 1.100.

EXAMPLE 3

This example shows the use of the instant lactone-polyesters as reactive diluents. A "test" coating composition was formulated with the lactone-polyester polyol of Example 1 as a reactive diluent, in combination with another polyester polyol and an aminoplast curing agent and other ingredients as listed below. A "control" composition having essentially the same composition, with the exception of the reactive diluent, was also formulated.

| Ingredients | Parts by Weight (grams) | | Solids | |
|---|---|---|---|---|
| | Test | Control | Test | Control |
| Polyester polyol[a] | 110 | 110 | 91.85 | 91.85 |
| n-butyl alcohol | 26.4 | 26.4 | — | — |
| SOLVESSO 100[b] | 30.3 | 30.3 | — | — |
| Resin from Part 2 of Example 1 | 64.6 | — | 63.98 | — |
| Melamine-formaldehyde resin[c] | 145 | 145 | 145 | 145 |
| Ethyl alcohol | 18 | 18 | — | — |
| Strong acid catalyst | 20 | 20 | — | — |

[a]Polyester from isophthalic acid/adipic acid/trimethylpentane-diol: 5.47/4.53/16.62 mole ratio, 90% in SOLVESSO 100.
[b]Aromatic hydrocarbon with a flash point of 100° F. (38° C.), available from Exxon Inc.
[c]RESIMINE 747, available from Monsanto Chemical Company. Films were sprayed onto Bonderite 1000 panels and baked 10 minutes at 350° F. (177° C.).

The coating compositions were evaluated for the effectiveness of the diluent by comparing the following pertinent characteristics. The test composition had a viscosity of 19 seconds, as measured with a number 3 Zahn cup, percent non-volatiles of 70.6 and VOC of 2.55. In contrast, the control had a viscosity of 24 seconds as measured with a number 3 Zahn cup, percent non-volatiles of 70.5 and VOC of 2.56.

What is claimed is:

1. A polyester-urethane polyol which is prepared by reacting a polyisocyanate with a stoichiometric excess of being a polyester polyol; the polyester polyol being formed by:
   (1) reacting a diol with a lactone or a functional equivalent thereof, wherein the diol is in an amount sufficient to produce a reaction product containing about 5 percent or higher of unreacted diol; followed by
   (2) removing about 30 percent or higher of the unreacted diol under essentially non-reacting conditions.

2. A polyester-urethane polyol of claim 1, wherein the polyisocyanate is a diisocyanate comprising trimethylhexamethylene diisocyanate.

3. A polyester-urethane polyol of claim 1, wherein the polyisocyanate and the polyester polyol are reacted in the equivalent ratio of 0.02 to 0.8:1.

4. A high solids composition comprising a polyester-urethane polyol which is prepared by reacting trimethylhexamethylene diisocyanate with a polyester polyol composition which is formed by reacting 2,2,4-trimethyl-1,3-pentanediol with epsilon-caprolactone in a mole ratio of about 3:1, followed by removing about 30 percent or higher unreacted diol under essentially non-reacting conditions.

5. A high solids coating composition comprising a polyester polyol and a curing agent wherein the polyester polyol has a number average molecular weight of about 1000 and is prepared by reacting a low molecular weight starting diol with a lactone or a functional equivalent thereof, wherein the starting diol is in an amount sufficient to produce a reaction product containing about 5 percent by weight or higher of unreacted starting diol.

6. A high solids thermosetting coating composition having a sprayability of at least 40 percent which comprises a curing agent and a polyester polyol having a number average molecular weight of up to about 1000 which is prepared by reacting a low molecular weight polyol with a lactone or a functional equivalent thereof, wherein the starting polyol is in an amount sufficient to produce a reaction product containing at least about 5 percent unreacted starting polyol; said reaction is followed by removing about 30 percent or higher of the unreacted starting polyol, under essentially non-reacting conditions.

7. A high solids thermosetting coating composition having a sprayability of at least 40 percent which comprises a curing agent and a polyester polyol having a number average molecular weight of up to about 1000 which is prepared by reacting a diol with a lactone; wherein the diol is in an amount sufficient to produce a reaction product containing about 5 percent by weight unreacted diol; followed by removing about 30 percent by weight of the unreacted diol, under essentially non-reacting conditions.

8. A high solids thermosetting coating composition having a sprayability of at least 40 percent which comprises a curing agent and the polyurethane polyol of claim 1.

9. A high solids thermosetting coating composition of claim 8 wherein the curing agent is a melamine or an isocyanate.

* * * * *